United States Patent
Khosravi et al.

(10) Patent No.: US 11,927,148 B2
(45) Date of Patent: Mar. 12, 2024

(54) DIRECT-INJECTION, APPLIED-IGNITION INTERNAL COMBUSTION ENGINE WITH INJECTION DEVICE ARRANGED IN THE CYLINDER LINER, AND METHOD FOR OPERATING AN INTERNAL COMBUSTION ENGINE OF SAID TYPE

(71) Applicant: Ford Global Technologies, LLC, Dearborn, MI (US)

(72) Inventors: Maziar Khosravi, Cologne (DE); Helmut Hans Ruhland, Eschweiler (DE); Albert Breuer, Cologne (DE); Thomas Lorenz, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 632 days.

(21) Appl. No.: 16/906,838

(22) Filed: Jun. 19, 2020

(65) Prior Publication Data
US 2020/0318573 A1    Oct. 8, 2020

Related U.S. Application Data

(62) Division of application No. 15/649,169, filed on Jul. 13, 2017, now Pat. No. 10,774,776.

(30) Foreign Application Priority Data

Jul. 15, 2016  (DE) .......................... 102016212951.1

(51) Int. Cl.
*F02D 41/30*  (2006.01)
*F02B 23/08*  (2006.01)
(Continued)

(52) U.S. Cl.
CPC .......... *F02D 41/402* (2013.01); *F02B 23/08* (2013.01); *F02D 41/3094* (2013.01);
(Continued)

(58) Field of Classification Search
CPC .............. F02D 41/402; F02D 41/3094; F02D 41/3836; F02D 2041/3881;
(Continued)

(56) References Cited

U.S. PATENT DOCUMENTS 2,058,487 A * 10/1936 Mock ..................... F02M 69/00
                                                    123/301
2,800,118 A *  7/1957 Scherenberg .......... F02M 69/00
                                                    123/308
(Continued)

FOREIGN PATENT DOCUMENTS

DE    102012104336 A1 * 11/2012   .......... F02B 23/0651
DE    202016102651 U1    7/2016
(Continued)

OTHER PUBLICATIONS

Breuer, A. et al., "Internal Combustion Engine With Injection Device Arranged in the Cylinder Barrel, and Method for Operating an Internal Combustion Engine of Said Type," U.S. Appl. No. 15/630,124, filed Jun. 22, 2017, 41 pages.

*Primary Examiner* — George C Jin
*Assistant Examiner* — Teuta B Holbrook
(74) *Attorney, Agent, or Firm* — Vincent Mastrogiacomo; McCoy Russell LLP

(57) ABSTRACT

A method for operating a fuel injection system is provided. The method includes injecting fuel from a first direct fuel injection device arranged in a cylinder liner in a cylinder block into a combustion chamber and injecting fuel from a second direct fuel injection device arranged in a cylinder head into the combustion chamber, the first and second direct fuel injection devices arranged at an obtuse angle with regard to an intersection of central axes of the first and second direct fuel injection devices.

14 Claims, 3 Drawing Sheets

(51) Int. Cl.
*F02D 41/38* (2006.01)
*F02D 41/40* (2006.01)
*F02F 1/00* (2006.01)
*F02F 3/00* (2006.01)
*F02M 61/14* (2006.01)
*F02F 1/24* (2006.01)

(52) U.S. Cl.
CPC .......... *F02D 41/3836* (2013.01); *F02F 1/004* (2013.01); *F02F 3/00* (2013.01); *F02M 61/14* (2013.01); *F02B 2023/085* (2013.01); *F02D 2041/3881* (2013.01); *F02D 2041/389* (2013.01); *F02D 2200/024* (2013.01); *F02D 2200/1002* (2013.01); *F02D 2200/101* (2013.01); *F02F 1/242* (2013.01); *Y02T 10/12* (2013.01)

(58) Field of Classification Search
CPC ......... F02D 2041/389; F02D 2200/024; F02D 2200/1002; F02D 2200/101; F02D 37/02; F02B 23/08; F02B 2023/085; F02B 2075/125; F02B 23/0669; F02B 23/104; F02B 23/101; F02B 17/005; F02B 23/105; F02B 2275/16; F02B 2201/064; F02B 2201/06; F02B 2201/062; F02B 2201/0622; F02B 2201/066; F02F 1/004; F02F 3/00; F02F 1/242; F02M 61/14; F02M 69/045; Y02T 10/12
See application file for complete search history.

(56) References Cited

U.S. PATENT DOCUMENTS

| | | | | |
|---|---|---|---|---|
| 3,154,059 A * | 10/1964 | Clark, Jr. | ............. | F02B 17/005 123/301 |
| 3,919,982 A * | 11/1975 | Goto | ........................ | F02B 3/04 123/193.6 |
| 4,318,377 A * | 3/1982 | Occella | ................. | F02B 23/104 123/298 |
| 4,543,930 A | 10/1985 | Baker | | |
| 5,421,301 A * | 6/1995 | Feuling | ................. | F02B 23/104 123/298 |
| 5,735,240 A * | 4/1998 | Ito | ........................ | F02B 23/105 123/298 |
| 6,148,792 A * | 11/2000 | Hei Ma | ................. | F02F 1/4214 123/298 |
| 6,883,491 B2 * | 4/2005 | Arndt | ..................... | F02B 23/105 123/305 |
| 10,590,898 B2 | 3/2020 | Breuer et al. | | |
| 2009/0277432 A1 * | 11/2009 | Hung | ..................... | F02M 43/04 123/299 |
| 2009/0319156 A1 * | 12/2009 | Fujikawa | ............... | F02B 23/104 123/308 |
| 2011/0162620 A1 | 7/2011 | Bidner et al. | | |
| 2013/0319376 A1 * | 12/2013 | Mathey | ............... | F02D 41/3047 123/472 |
| 2014/0116390 A1 | 5/2014 | Foege | | |
| 2014/0116392 A1 * | 5/2014 | Fiveland | ............ | F02M 21/0275 123/470 |
| 2014/0283793 A1 | 9/2014 | Tuerker et al. | | |
| 2017/0306890 A1 * | 10/2017 | Atkins | ............... | F02M 21/0227 |
| 2018/0003140 A1 * | 1/2018 | Breuer | .................... | F02M 61/14 |
| 2018/0313239 A1 * | 11/2018 | Bennedsen | ............... | F02F 1/20 |

FOREIGN PATENT DOCUMENTS

| | | | | |
|---|---|---|---|---|
| EP | 1088971 A2 * | 4/2001 | ........... | F02B 23/105 |
| JP | 2008095558 A * | 4/2008 | | |
| WO | WO-2015078963 A1 * | 6/2015 | .......... | F02B 23/0651 |

* cited by examiner

DIRECT-INJECTION, APPLIED-IGNITION INTERNAL COMBUSTION ENGINE WITH INJECTION DEVICE ARRANGED IN THE CYLINDER LINER, AND METHOD FOR OPERATING AN INTERNAL COMBUSTION ENGINE OF SAID TYPE

CROSS REFERENCE TO RELATED APPLICATIONS

The present application is a divisional for U.S. Non-Provisional patent application Ser. No. 15/649,169, entitled "DIRECT-INJECTION, APPLIED-IGNITION INTERNAL COMBUSTION ENGINE WITH INJECTION DEVICE ARRANGED IN THE CYLINDER LINER, AND METHOD FOR OPERATING AN INTERNAL COMBUSTION ENGINE OF SAID TYPE," filed on Jul. 13, 2017. U.S. application Ser. No. 15/649,169 claims priority to German Patent Application No. 102016212951.1, filed on Jul. 15, 2016. The entire contents of the above-referenced application are hereby incorporated by reference in its entirety for all purposes.

FIELD

The present description relates generally to methods and systems for a direct-injection internal combustion engine.

BACKGROUND/SUMMARY

According to the prior art, use is made of injection devices whose injection jets exhibit a reduced or small penetration depth into the combustion chamber. In practice, it has however been found that, despite a reduced penetration depth, the combustion chamber internal walls are wetted with fuel, specifically even if the injection jets do not directly strike the combustion chamber internal walls. Charge movement in the combustion chamber may be the cause of this is non-evaporated liquid fuel that, in the form of fuel droplets, is transported to the combustion chamber internal walls, and wets these.

The prior art has also disclosed concepts in which the cylinders of the internal combustion engine are each equipped with an injection nozzle in the region of the cylinder liner. The injection nozzle of a cylinder is in this case oriented toward the cylinder head and in some cases toward the outlet valve of the cylinder. This feature is intended to assist and accelerate the evaporation of the fuel particles or fuel droplets and thus the mixture formation. At the same time, the head and the closed outlet valve are cooled by way of fuel. It is also sought in fuel injection systems to reduce pollutant emissions. It is also possible for two injection nozzles to be provided in the region of the cylinder liner, whereby it is sought to further increase mixing of the air-fuel mixture. U.S. Pat. No. 5,421,301 describes such an internal combustion engine.

A disadvantage of the injection method described in U.S. Pat. No. 5,421,301, and generally of internal combustion engines whose cylinders are equipped with an injection device in the region of the cylinder liner, is that an injection can be performed only when the cylinder-specific piston, on its path toward bottom dead center, has passed the injection device and makes the combustion chamber accessible to the openings of the injection device. The crank angle window, in which an injection can be performed, is thus restricted. This is all the more relevant because, in the case of a direct injection, it is inherently already the case that very little time is available for the mixture formation.

An injection nozzle which is oriented toward the cylinder head, as described in U.S. Pat. No. 5,421,301, supplies fuel only to the cylinder-head-side region of the combustion chamber during the course of the injection process, whereas the region of the combustion chamber between the injection device and bottom dead center, that is to say the piston-side region of the combustion chamber, remains disregarded during the injection.

Against the background of that stated above and recognizing the aforementioned problems the inventors have developed a method for operating a fuel injection system to resolve at least some of the problems. In one example, the method includes injecting fuel from a first direct fuel injection device arranged in a cylinder liner in a cylinder block into a combustion chamber and injecting fuel from a second direct fuel injection device arranged in a cylinder head into the combustion chamber, the first and second direct fuel injection devices arranged at an obtuse angle with regard to an intersection of central axes of the first and second direct fuel injection devices. Injecting fuel into combustion chamber with injection devices arranged at an obtuse angle with regard to one another enables the fuel jets interact with one another to increase air-fuel mixing and decrease wall wetting within the combustion chamber. Consequently, combustion efficiency is increased and emissions are correspondingly reduced. In one example, the first direct fuel injection device may be positioned on an exhaust side of the combustion chamber in the cylinder liner and the second direct fuel injection device may be positioned between an intake valve and an exhaust valve in the cylinder head. When the fuel injection devices are arranged in this way the fuel spray from the devices may interact with one another and the intake airflow to increase tumble and/or swirl airflow patterns in the intake airflow. Consequently, mixing of the air-fuel mixture may be further increased, thereby increasing combustion efficiency.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 1 is shown approximately to scale, although other relative dimensions may be used, if desired.

DETAILED DESCRIPTION

Figure 1:
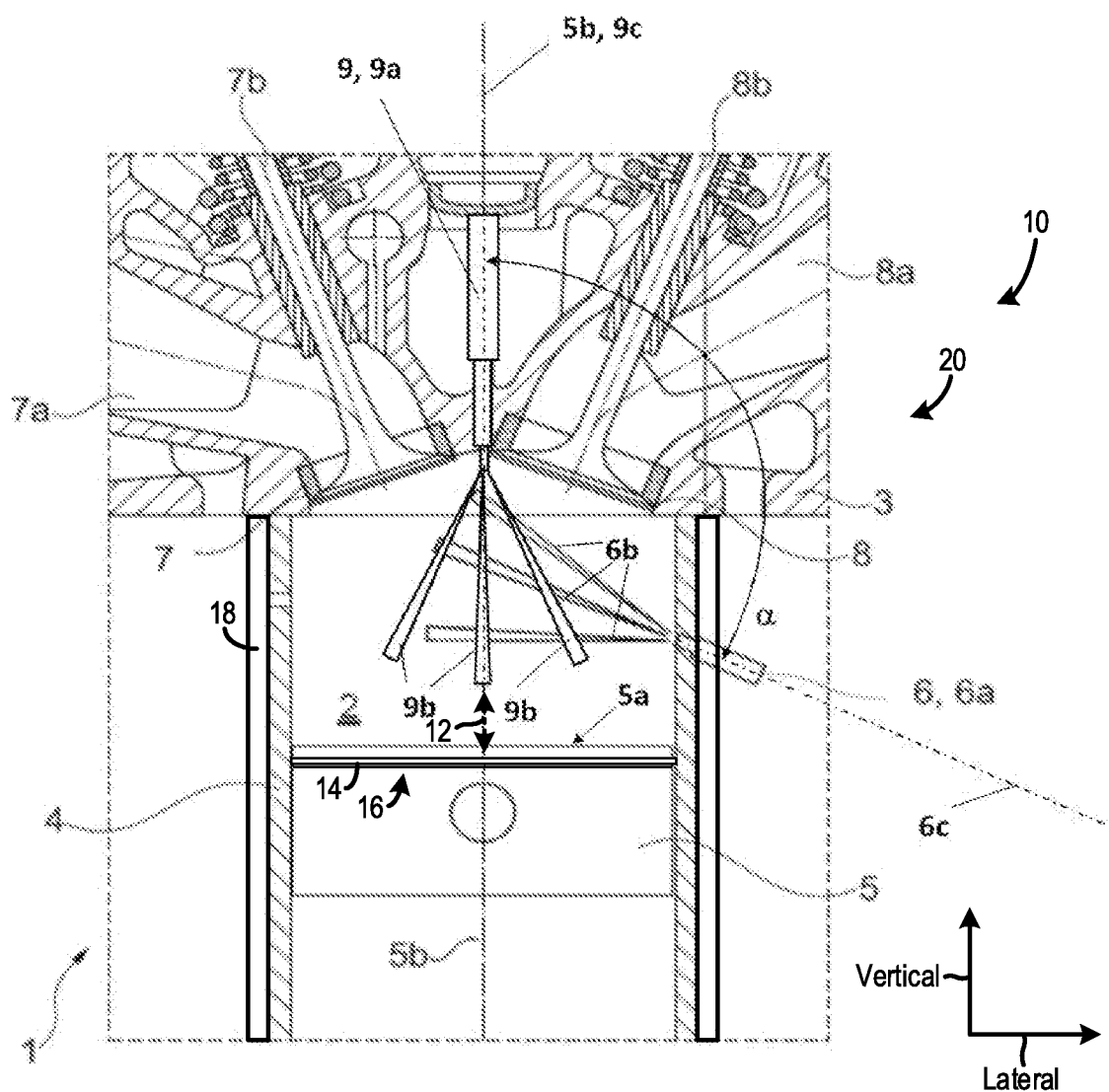
FIG. 1 schematically shows, in cross section, a cylinder in an internal combustion engine.

The following description relates to a direct-injection system in an applied-ignition internal combustion engine and a method for operation of such a system. In one example, the engine may include at least one cylinder head with at least one cylinder, in which each cylinder has at least one inlet opening for the supply of combustion air via an intake system and at least one outlet opening for the discharge of the exhaust gases via an exhaust-gas discharge system. Continuing with such an example, each cylinder may include a combustion chamber which is jointly formed by a piston crown of a cylinder-specific piston, by a cylinder liner which laterally delimits the combustion chamber, and by the at least one cylinder head, the piston being movable along a piston longitudinal axis between a bottom dead center and a top dead center, and each cylinder is equipped, in a region of the cylinder liner, with an injection device for the direct injection of fuel into the combustion chamber, the injection device having at least one opening which, during the course of an injection process, can be activated for the purposes of introducing fuel into the combustion chamber.

A method for operating an internal combustion engine of said type is also described herein. An internal combustion engine of the stated type may be used as a motor vehicle drive unit. Within the context of the present description, the expression "internal combustion engine" encompasses applied-ignition Otto-cycle engines but also applied-ignition hybrid internal combustion engines, that is to say applied-ignition internal combustion engines that are operated using a hybrid combustion process, and hybrid drives which may include not only the applied-ignition internal combustion engine but also an electric machine which can be connected in terms of drive to the internal combustion engine and which receives power from the internal combustion engine or which, as a switchable auxiliary drive, additionally outputs power.

Internal combustion engines may have a cylinder block and at least one cylinder head that are connected to one another to form the cylinders and the combustion chambers thereof. The cylinder block, as the upper crankcase half, may serve for the mounting of the crankshaft and for accommodating the piston and the cylinder sleeve of each cylinder. The piston may also, with the omission of a sleeve as an intermediate element, be mounted and guided directly in a bore of the block. As described herein, both the cylinder sleeve and the bore may be subsumed under the expression "cylinder liner".

The cylinder head normally serves for accommodating the valve drives needed for the charge exchange. During the course of the charge exchange, the discharge of the combustion gases via the exhaust-gas discharge system may take place via the at least one outlet opening, and the feed of the combustion air via the intake system may take place via the at least one inlet opening of the cylinder.

In the case of four-stroke engines, lifting valves for the control of the charge exchange may be used (e.g., exclusively used) to control intake and/or exhaust flow. The valve, including the associated actuating mechanism, may be referred to as valve drive.

The crankshaft that is mounted in the crankcase may absorb the connecting rod forces and transform the oscillating stroke movement of the pistons into a rotational movement of the crankshaft. The upper crankcase half formed by the cylinder block may be regularly supplemented by the oil pan, which can be mounted on the cylinder block and which serves as the lower crankcase half.

In the development of internal combustion engines, it may be desirable to reduce (e.g., minimize) fuel consumption and pollutant emissions.

Fuel consumption may pose a problem in particular in the case of Otto-cycle engines, that is to say in the case of applied-ignition internal combustion engines. The reason for this may lie in the operating process of the traditional Otto-cycle engine. A traditional Otto-cycle engine may operate with external mixture formation and a homogeneous fuel-air mixture, in which the desired power is set by varying the charge of the combustion chamber, that is to say by means of quantity regulation. By adjusting a throttle flap that is provided in the intake system, the pressure of the inducted air downstream of the throttle flap may be reduced to a greater or lesser extent. For a constant combustion chamber volume, it may be possible in this way for the air mass, that is to say the quantity, to be set by means of the pressure of the inducted air, if desired. This also explains why quantity regulation may be disadvantageous specifically in part-load operation, because low loads may need a high degree of throttling and a large pressure reduction in the intake system, in one example, as a result of which the charge exchange losses increase with decreasing load and increasing throttling.

One approach for dethrottling the Otto-cycle working process may be direct fuel injection. The injection of the fuel directly into the combustion chamber of the cylinder may be a suitable measure for noticeably reducing fuel consumption even in Otto-cycle engines. The dethrottling of the internal combustion engine may be realized by virtue of fuel quantity regulation being used within certain limits.

With the direct injection of the fuel into the combustion chamber, it may be possible to realize a stratified combustion chamber charge, which can contribute (e.g., significantly contribute) to the dethrottling of the Otto-cycle working process because the internal combustion engine can be operated lean to a great extent by utilizing stratified charge operation, which offers thermodynamic advantages in particular in part-load operation, that is to say in the lower and middle load range, when small amounts of fuel are to be injected into the combustion chamber.

Direct injection may be characterized by an inhomogeneous combustion chamber charge. Conversely, direct injection may not be characterized by a uniform air ratio. Therefore, direct injection may have both lean ($\lambda>1$) mixture parts and rich ($\lambda<1$) mixture parts. The inhomogeneity of the fuel-air mixture may also be a reason why the particle emissions known from the diesel engine process are likewise of relevance in the case of the direct-injection Otto-cycle engine, whereas said emissions may be of reduced significance (e.g., almost no significance) in the case of the traditional Otto-cycle engine, in some instances.

In some examples, there may be relatively little time available for the injection of the fuel, for the mixture preparation in the combustion chamber, specifically the mixing of air and fuel and the preparation of the fuel within the context of preliminary reactions including evaporation, and for the ignition of the prepared mixture. Therefore, demands on the mixture formation may be particularly high, in some instances.

Since, in the case of direct injection, there may only be a little time available for the mixture formation, there may be a need to assist and accelerate the homogeneous formation of the air-fuel mixture before the initiation of the applied ignition, at least as long as there is no demand for stratified-charge operation. In this context, the distribution of the fuel in the combustion chamber, and also the injection of the fuel, may be of particular importance.

In the case of direct-injection Otto-cycle engines, formation of the air-fuel mixture may be conceptually divided into three distinct methods.

In the case of the air-controlled method, it may be desirable to influence the mixture formation by means of a movement forcibly imparted by the inlet flow as the air is inducted into the combustion chamber. It may be sought in this way to achieve a good mixture of the inducted air with the injected fuel, wherein it is the intention for a direct impingement of the injected fuel on the internal walls of the combustion chamber to be reduced (e.g., prevented) by means of the generated charge movement or flow.

For example, the generation of a so-called tumble or swirling flow may accelerate and/or assist the mixture formation. A tumble is an air vortex about an imaginary axis which runs parallel to the longitudinal axis, that is to say to the axis of rotation, of the crankshaft, by contrast to a swirl, which constitutes an air vortex whose axis runs parallel to the piston longitudinal axis, that is to say the cylinder longitudinal axis.

The arrangement and the geometry of the intake system, that is to say of the intake lines, may have an influence (e.g., significant influence) on the charge movement and thus on the mixture formation in the combustion chamber. In some examples, the charge movement in the cylinder may be concomitantly influenced by the combustion chamber geometry, in particular by the geometry of the piston crown and/or of a piston depression that is optionally provided in the piston crown.

Attempts have been made in direct-injection internal combustion engines, to use (e.g., exclusively use) piston depressions to promote air-fuel mixing. In some instances, the piston depressions may be rotationally symmetrical with regard to the piston longitudinal axis and in some specific cases, the piston may have an omega-shaped depression.

Owing to the constricted space conditions in the cylinder head, an improvement of the intake lines with regard to mixture formation and charge exchange may not be possible (e.g., fully possible), in some instances.

In the case of the wall-controlled method, the fuel may be injected into the combustion chamber in such a way that the injection jet is purposely directed toward a wall delimiting the combustion chamber. Specifically in one example, the injection jet may be directed into a depression provided on the piston crown. Here, it is the intention for the fuel jet to be, because of the impingement, broken up into multiple jet parts and diverted such that the fuel jets encompass a large area of the combustion chamber. In particular, some of the injected fuel may be diverted into the vicinity of the ignition device in order to form an ignitable mixture with the inducted air.

Whereas it may be the case in the air-controlled method that it may be desirable to reduce (e.g., substantially inhibit) direct impingement of the injected fuel on the internal walls of combustion chamber. It may be taken into consideration in this context that the wetting of the internal walls of the combustion chamber with fuel promotes oil thinning, and increases the untreated emissions of unburned hydrocarbons and the particle emissions.

In the case of the jet-controlled method, the injected fuel is targeted in the direction of the ignition device, which may be achieved by orienting the injection jets, the injection device, and the ignition device in a coordinated manner. For example, both the ignition device and the injection device may be centrally arranged in the cylinder head on the side facing the piston crown.

In another example, the fuel may be transported and distributed substantially owing to the impetus of the injection jet, such that the mixture formation may be relatively independent of the combustion chamber geometry, which constitutes a significant advantage in relation to the two other methods. The jet-controlled method may be suitable in particular for stratified operation of the internal combustion engine, because firstly, an ignitable mixture can be formed in a closely confined area around the ignition device, and secondly, a low fuel concentration can be realized in large areas of the combustion chamber.

Some methods for air-fuel mixture formation exhibit both an air-controlled component and a jet-controlled component.

Additionally, some engines have arranged the injection device in the cylinder head on the side facing the piston crown. Depending on the penetration depth of the injection jets, the injected fuel quantity and the injection time, that is to say the position of the piston, a greater or lesser fraction of the fuel may impinge on the combustion chamber internal walls (e.g., cylinder liner and piston crown) during the injection and mixes with the oil film adhering thereto. The fuel therefore may pass together with the oil into the crankcase and thus contributes to oil thinning. The wetting of the combustion chamber internal walls with fuel furthermore has an adverse effect on the untreated emissions of unburned hydrocarbons and on the particle emissions. The fuel injection system described herein seeks to reduce (e.g., prevent) wetting of the combustion chamber internal walls with injected fuel.

The above statements make it clear that, in the case of direct-injection applied-ignition internal combustion engines, there is still a demand for increased air-fuel mixing and a reduction in wall wetting.

It is an objective of the invention to provide an applied-ignition, direct-injection internal combustion engine, in the case of which the mixture formation, in particular the homogenization of the fuel-air mixture, is increased and the wetting of the combustion chamber internal walls with injected fuel is reduced (e.g., prevented).

It is a further sub-objective of the invention to provide to a method for operating an internal combustion engine of said type.

The first sub-objective may be achieved by means of a direct-injection, applied-ignition internal combustion engine having at least one cylinder head including at least one cylinder, in which each cylinder has at least one inlet opening for the supply of combustion air via an intake system and at least one outlet opening for the discharge of the exhaust gases via an exhaust-gas discharge system, each cylinder includes a combustion chamber which is jointly formed by a piston crown of a cylinder-specific piston, by a cylinder liner which laterally delimits the combustion chamber, and by the at least one cylinder head, the piston being movable along a piston longitudinal axis between a bottom dead center and a top dead center, each cylinder is equipped, in a region of the cylinder liner, with an injection device for the direct injection of fuel into the combustion chamber, which injection device has at least one opening which, during the course of an injection process, can be activated for the purposes of introducing fuel into the combustion chamber, and each cylinder is equipped with an additional injection device which is arranged in the cylinder-specific cylinder head, the injection device being oriented toward the additional injection device such that a virtual elongation of a longitudinal axis of the injection device forms an obtuse angle $\alpha$ with a virtual elongation of a longitudinal axis of the additional injection device in a projection perpendicular to the piston longitudinal axis.

In the case of the internal combustion engine described herein, each cylinder may be equipped with at least two injection devices, specifically one injection device that is arranged in the cylinder-specific cylinder liner region, and an additional injection device, that is arranged in the cylinder-specific cylinder head. This yields numerous advantages and/or technically advantageous effects.

Specifically in one example, the two injection devices may be oriented such that the virtual elongation of the longitudinal axis of the injection device forms an obtuse angle α with the longitudinal axis of the additional injection device or the virtual elongation thereof, or the longitudinal axis of the injection device forms an obtuse angle α with the virtual elongation of the longitudinal axis of the additional injection device, wherein, in the context of the present description, an obtuse angle is an angle between 90° and 180°. In the context of the present description, the longitudinal axis may also be regarded as a part of the virtual elongation of the longitudinal axis.

In an example, the injection devices may be mutually oriented toward one another, specifically in such a way that at least some of the fuel jets emerging from the two injection devices and entering the combustion chamber are directed toward one another and collide or interact with one another. The high impetuses of the fuel jets which may be directed toward one another and collide with one another enable fine atomization of the fuel and a rapid and widespread distribution of the fuel in the combustion chamber, wherein the fuel mixes and interacts with the combustion air situated in the combustion chamber. This increases in particular the homogenization of the fuel-air mixture, but also assists and accelerates the evaporation of the fuel particles or fuel droplets and thus the mixture formation as a whole. Here, it will also be taken into consideration that the fuel jets which are directed toward one another and collide with one another give rise to additional turbulence in the combustion chamber, that is to say considerably increase the degree of turbulence in the combustion chamber. For instance, directing fuel injection jets towards one another from different injectors may increase the swirl and/or tumble of the air-fuel mixture in the combustion chamber.

The accelerated distribution of the fuel in the combustion chamber utilizing the high impetuses of the fuel jets that are directed toward one another may be highly advantageous with regard to the fact that, in the case of a direct injection, only a small amount of time may be available for the mixture formation. In this context, it will also be taken into consideration that the crank angle window in which injection can be performed may be particularly limited in the case of an injection nozzle arranged in the region of the cylinder liner.

The rapid and extensive evaporation of the fuel particles likewise makes allowance for this fact, and furthermore reduces the likelihood (e.g., prevents) of wetting the combustion chamber internal walls with liquid fuel. Along with the wetting of the combustion chamber internal walls, the disadvantageous effects associated therewith, in particular the oil thinning and increased emissions of unburned hydrocarbons and soot, are also reduced (e.g., eliminated).

Each injection device may reduce the penetration depth of the injection jets of the respective other injection device, whereby wetting of the combustion chamber internal walls with fuel may be counteracted.

The piston-side region of the combustion chamber may not be disregarded, as is the case for example in U.S. Pat. No. 5,421,301, in which the injection nozzle arranged in the region of the cylinder liner is directed toward the cylinder head and supplies fuel only to the cylinder-head-side region of the combustion chamber during the course of the injection process.

Further, in one example, an injection device and an additional injection device may intermittently inject fuel simultaneously into a combustion chamber. However, it will be appreciated that the injection device and the additional injection device may also be controlled independently of one another (e.g., individually controlled). Thus, in stratified-charge operation, it may be possible by means of an injection device arranged in the region of the cylinder liner for an ignitable fuel-air mixture to be generated in the cylinder-head-side region close to the ignition device before the initiation of the applied ignition.

With the internal combustion engine described herein, fuel-air mixing may be increased with regard to homogeneity and wall wetting of the combustion chamber internal walls with injected fuel is reduced (e.g., prevented).

Examples of the direct-injection, applied-ignition internal combustion engine may be advantageous in which the injection device is directed toward the additional injection device such that the fuel jets emerging from the injection device are directed counter to the fuel jets emerging from the additional injection device. In general, the fuel jets emerging from an injection device may form a cone or a club-shaped fuel cloud.

Further advantageous examples of the internal combustion engine will be explained herein. Examples of the direct-injection, applied-ignition internal combustion engine may be advantageous in which the injection device is inclined relative to the piston longitudinal axis in the direction of the at least one cylinder head. In this way, the risk of undesired wetting of the piston with fuel is further counteracted.

Examples of the direct-injection, applied-ignition internal combustion engine may be advantageous in which the additional injection device is arranged between the at least one inlet opening and the at least one outlet opening. If a cylinder has two or more inlet openings or outlet openings, a plane is laid through the inlet openings or outlet openings. Then, in the present example, the additional injection device may be arranged between said two planes.

In this context, examples of the direct-injection, applied-ignition internal combustion engine may be advantageous in which the additional injection device is arranged in the middle between the at least one inlet opening and the at least one outlet opening, that is to say centrally. The central arrangement of the additional injection device may, in individual cases, offer advantages with regard to the widespread distribution of the fuel in the combustion chamber and the homogenization of the fuel-air mixture.

Examples of the direct-injection, applied-ignition internal combustion engine may however also be advantageous in which the additional injection device is arranged eccentrically, that is to say laterally, in the cylinder head.

Examples of the direct-injection, applied-ignition internal combustion engine may be advantageous in which the following applies: angle α>120°, α>130° or α>140°. Angle α is discussed in greater detail herein with regard to FIG. 1.

Examples of the direct-injection, applied-ignition internal combustion engine may be particularly advantageous in which the following applies: angle α>150° or α>160°. Examples of the direct-injection, applied-ignition internal combustion engine may be advantageous in particular in which the following applies: angle α>170° or α≈180°.

As described herein, the greater the angle α, the more directly the injection devices are oriented toward one another, and the more pronounced are the desired and intended effects upon the collision of the fuel jets or fuel clouds directed toward one another, specifically a fine atomization and a rapid and widespread distribution of the fuel in the combustion chamber for the purposes of homogenization of the fuel-air mixture with simultaneous evaporation of the fuel.

Examples of the direct-injection, applied-ignition internal combustion engine may be advantageous in which the at least one cylinder-specific inlet opening and/or the at least one cylinder-specific outlet opening are/is arranged in the cylinder-specific cylinder head.

Examples of the direct-injection, applied-ignition internal combustion engine may be advantageous in which each cylinder has at least two inlet openings for the supply of combustion air.

It may be the objective of the valve drives to open and close the inlet and outlet openings of the cylinders at the correct times, with a fast opening of a large (e.g., greatest possible) flow cross sections being sought during the charge exchange in order to keep the throttling losses in the inflowing and outflowing gas low and in order to enable improvements in charging of the cylinder, and an effective discharge of the combustion gases. The cylinders of an internal combustion engine may therefore be equipped with two or more inlet and outlet openings respectively.

For the above reasons, examples of the direct-injection, applied-ignition internal combustion engine may therefore also be advantageous in which each cylinder has at least two outlet openings for the discharge of the exhaust gases.

Examples of the direct-injection, applied-ignition internal combustion engine may be advantageous in which each cylinder is equipped with another injection device (e.g., port injection device) which is arranged in the cylinder-specific intake system. By means of intake pipe injection, it may be possible, for example in part-load operation of the internal combustion engine, for fuel to be introduced into the intake system upstream of the inlet to a cylinder.

Examples of the direct-injection, applied-ignition internal combustion engine may be advantageous in which each cylinder is equipped with an ignition device for the purposes of initiating the applied ignition.

Here, examples of the direct-injection, applied-ignition internal combustion engine may be advantageous in which each cylinder is equipped with an additional ignition device for the purposes of initiating the applied ignition.

If the ignition is initiated at two spaced-apart positions of the two ignition devices, flames propagate in the combustion chamber from said two positions, wherein the prepared fuel-air mixture situated in the combustion chamber is encompassed by a flame more quickly than would be observed, or would be the case, if a single ignition device were used. The fuel-air mixture burns through, as it were, more quickly, which may result in thermodynamic advantages.

Examples of the direct-injection, applied-ignition internal combustion engine may be advantageous in which the at least one cylinder head is provided with at least one coolant jacket in order to form a liquid-type cooling arrangement.

The heat released during the combustion by the exothermic, chemical conversion of the fuel is dissipated partially to the cylinder head and cylinder block via the walls that may delimit the combustion chamber. Heat from the chemical conversion of the fuel may also be partially dissipated to the adjacent components and the environment via the exhaust-gas flow. To keep the thermal loading of the cylinder head within desired limits, a part of the heat flow introduced into the cylinder head may be extracted from the cylinder head again.

It may be possible for the cooling arrangement to take the form of an air-type cooling arrangement or a liquid-type cooling arrangement. Because of the significantly higher heat capacity of liquids in relation to air, it is possible for significantly greater quantities of heat to be dissipated using a liquid-type cooling arrangement, for which reason internal combustion engines are generally equipped with a liquid-type cooling arrangement. In this context, it will be taken into consideration that the thermal load of the cylinder head is ever increasing, inter alia, because an increasing proportion of internal combustion engines is supercharged—by means of exhaust-gas turbocharger or mechanical supercharger. On account of the ever more dense packaging in the engine bay and the increasing integration of parts and components into the cylinder head, for example the integration of the exhaust-gas manifold, the thermal loading of the cylinder head is increased, such that increased demands are placed on the cooling arrangement and measures are taken to reliably prevent thermal overloading of the internal combustion engine. Efforts to use lighter materials for producing the head, which are less resistant to thermal load, furthermore increase the demands on the cooling arrangement.

If the internal combustion engine has a liquid cooling arrangement, a plurality of coolant ducts or at least one coolant jacket may be generally formed in the cylinder head, which coolant ducts or coolant jacket conduct(s) the coolant through the cylinder head; this may need a highly complex cylinder head structure, in one example.

Examples may be advantageous in which a coolant jacket is integrated in the at least one cylinder head, which coolant jacket has a lower coolant jacket, which is arranged between the exhaust-gas lines and the assembly surface of the cylinder head, and an upper coolant jacket, which is arranged on that side of the exhaust-gas lines which is situated opposite the lower coolant jacket.

Examples of the direct-injection, applied-ignition internal combustion engine may be advantageous in which the cylinder-specific piston is, for the purposes of sealing off the combustion chamber, equipped with at least one piston ring that is arranged in a piston skirt region that laterally delimits the piston.

In this context, examples of the direct-injection, applied-ignition internal combustion engine may be advantageous in which, when the piston may be situated at top dead center, the at least one piston ring may be positioned between the injection device and top dead center.

A piston situated at top dead center then covers the injection device arranged in the cylinder liner region, such that the injection device is exposed to the cylinder pressure in unprotected fashion only when a piston moving toward bottom dead center uncovers the injection device at the combustion chamber side. The injection device is consequently subjected to lower pressures. This facilitates the sealing of the injection device. The design of the seal is facilitated simply owing the fact that the region of the cylinder head is thermally less highly loaded than, for example, the cylinder head.

In principle, an injection may be performed when the cylinder-specific piston, on its path toward bottom dead center, has passed the injection device and makes the combustion chamber accessible to the openings of the injection device.

Examples of the direct-injection, applied-ignition internal combustion engine may be advantageous in which the injection device is oriented toward the at least one cylinder-specific inlet opening in such a way that the fuel emerging from the injection device is directed counter to the combustion air entering the combustion chamber via the inlet opening.

In an example of the fuel injection system described herein, the injection device arranged in the cylinder liner region may be directed toward the cylinder-specific cylinder head and not however toward the outlet—as described in the prior art, for example U.S. Pat. No. 5,421,301—but rather toward the inlet of the cylinder, specifically toward the at least one cylinder-specific inlet opening, such that the fuel introduced into the combustion chamber can interact with the oppositely directed combustion air flowing into the combustion chamber.

The airflow entering the combustion chamber may reduce the penetration depth of the injection jets of the injection device, whereby wetting of the combustion chamber internal walls with fuel may be further counteracted. Owing to the orientation of the injection device towards the cylinder head, it is the case in particular that wetting of the piston may be reduced (e.g., prevented).

The orientation of the injection jets counter to the entering airflow is furthermore intended to assist and accelerate the evaporation of the fuel particles and the widespread distribution of the fuel in the combustion chamber and advance and thereby increase the homogenization of the fuel-air mixture. By contrast to the concepts described in the prior art, it is the case that, utilizing the flow dynamics, both the cylinder-head-side region of the combustion chamber and the piston-side region of the combustion chamber are supplied with fuel.

If fuel passes into the intake system when the inlet opening is open, said fuel can serve for cleaning, and removing deposits from, the rear side of the associated inlet valve.

A method for operating the internal combustion engine is also described herein. The method may include a process in which the fuel quantity that is introduced into the combustion chamber during the course of one working cycle is made up of a fuel quantity $m_{1,fuel}$ introduced by means of the injection device and a fuel quantity $m_{2,fuel}$ introduced by means of the additional injection device, the ratio $m_{1,fuel}/m_{2,fuel}$ being defined as a function of: the engine speed $n_{mot}$ of the internal combustion engine, the load of the internal combustion engine, the pressure of the combustion air in the intake system upstream of the at least one cylinder, and/or the speed of the combustion air in the intake system upstream of the at least one cylinder.

That which has already been stated with regard to the internal combustion engine also applies to the method described herein, for which reason reference is generally made at this juncture to the statements made above with regard to the internal combustion engine.

In general, the opening of an injection device may be activated by virtue of said opening being connected to a fuel supply system, and thus opened up, for the purposes of injecting fuel into the cylinder. The injection process is ended by virtue of the openings being separated from the fuel supply system, that is to say deactivated. The activation and/or deactivation of the openings may also be performed with a time offset, in one example.

In some examples, the use of two injection devices may be particularly advantageous at operating points in which large fuel quantities are introduced into the cylinder, that is to say at high loads. It is however also possible—as already mentioned—for each of the two injection devices to be utilized individually, such that, in predefinable operating points, only one of the two injection devices is used for the purposes of introducing fuel. The additional injection device has proven—individually or in combination—to be particularly suitable if the piston is at a certain distance from top dead center and large fuel quantities are to be injected.

Examples of the method may also be advantageous in which, at least intermittently, fuel is injected simultaneously by means of the injection device and by means of the additional injection device.

Examples of the method may be advantageous in which at least one cylinder-specific inlet opening is opened before fuel is introduced by means of the injection device or the additional injection device.

FIG. 1 schematically shows, an example engine 10 with a cylinder 1, in cross section along a piston longitudinal axis 5b. The piston longitudinal axis 5b may lie on a central axis 12 of the cylinder 1. A vertical axis and a lateral axis are provided for reference in FIG. 1. The vertical axis may be parallel to a gravitational axis, in one example. However, other orientations of the vertical and lateral axes have been contemplated.

The cylinder 1, illustrated in FIG. 1, has two outlet openings 8 for the discharge of the exhaust gases via an exhaust-gas discharge system, each outlet opening 8 being adjoined by an exhaust-gas line 8a, and each outlet opening 8 being equipped with an outlet valve 8b for the purposes of opening up or closing the outlet opening 8 during the course of the charge exchange. Furthermore, the cylinder 1 has two inlet openings 7 for the supply of the combustion air via an intake system, each inlet opening 7 being adjoined by an intake line 7a, and each inlet opening 7 being equipped with an inlet valve 7b for the purposes of opening up or closing the inlet opening 7 during the course of the charge exchange.

Each cylinder 1 of the internal combustion engine 10 includes a combustion chamber 2 which is jointly formed by the piston crown 5a of a cylinder-specific piston 5, by a cylinder liner 4 in a cylinder block 18 which laterally delimits the combustion chamber 2, and by the cylinder head 3. When the internal combustion engine is in operation, the piston 5 oscillates along the piston longitudinal axis 5b between a bottom dead center and a top dead center. A piston ring 14 is arranged in a piston skirt 16 of the piston 5. The piston ring 14 laterally delimits the piston 5 and seals off the combustion chamber 2.

Each cylinder 1 of the internal combustion engine is equipped, in the region of the cylinder liner 4, with an injection device 6 for the direct introduction of fuel into the combustion chamber 2. In the present case, an injection nozzle 6a serves as injection device 6 (e.g., direct fuel injection device), which injection nozzle is inclined relative to the piston longitudinal axis 5b and has multiple openings which, during the course of an injection process, are activated, that is to say opened up, for the purposes of introducing fuel into the combustion chamber 2. To end the injection process, the openings of the injection nozzle 6a are fluidly disconnected from the fuel supply system.

The injection nozzle 6a is directed toward a cylinder-specific inlet opening 7, specifically such that the fuel jets 6b emerging from the injection nozzle 6a are directed counter to the combustion air entering the combustion chamber 2 via the inlet opening 7.

Furthermore, each cylinder 1 is equipped with an additional injection device 9 that may be arranged in a vertically standing manner in the cylinder-specific cylinder head 3 to be situated opposite the piston 5. In the present case, as additional injection device 9, use is again made of injection nozzle 9a, which is positioned in the middle between the inlet openings 7 and the outlet openings 8. Specifically, a longitudinal axis 9c (e.g., central axis) of the injection device 9 is parallel to a longitudinal axis 5b (e.g., central axis) of the piston 5. However, the additional injection device 9 may be arranged at other angles with regard to the piston 5, in other examples. For instance, the longitudinal axis 9c may be arranged at an angle between ±10° with regard to the longitudinal axis 5b of the piston 5.

The injection device 6 is directed toward the additional injection device 9, specifically in such a way that the virtual elongation of the longitudinal axis 6c of the injection device 6 forms an obtuse angle α≈120° with the virtual elongation of the longitudinal axis 9c of the additional injection device 9 in a projection perpendicular to the piston longitudinal axis 5b, that is to say in the plane of the drawing. However, in other examples, the obtuse angle obtuse angle may be in the following range, 120°≤α≤180°.

The injection jets 6b, 9b of the injection devices 6, 9 are likewise illustrated in the projection perpendicular to the piston longitudinal axis 5b.

The fuel jets 6b, 9b or fuel clouds generated by means of the two injection devices 6, 9 collide or interact with one another. Owing to the high impetuses of the fuel jets 6b, 9b that collide with one another, the fuel is atomized and is distributed in widespread fashion in the combustion chamber 2, whereby good mixing with the air situated in the combustion chamber 2, and thus increased homogenization of the fuel-air mixture, is realized. The collision of the fuel jets 6b, 9b may give rise to additional turbulence in the combustion chamber 2. The evaporation of the fuel is also advantageously assisted and accelerated by the collision of the injection jets 6b, 9b. Wetting of the combustion chamber internal walls with liquid fuel may also be reduced (e.g., prevented) due to the interaction between the fuel jets.

The injection device 6 and the additional injection device 9 may be included in a fuel delivery system 20, described in detail herein. In one example, a fuel tank and a fuel pump included in the fuel delivery system 20 may be configured to provide pressurized fuel to the injection device 6 and the additional injection device 9.

Figure 2:
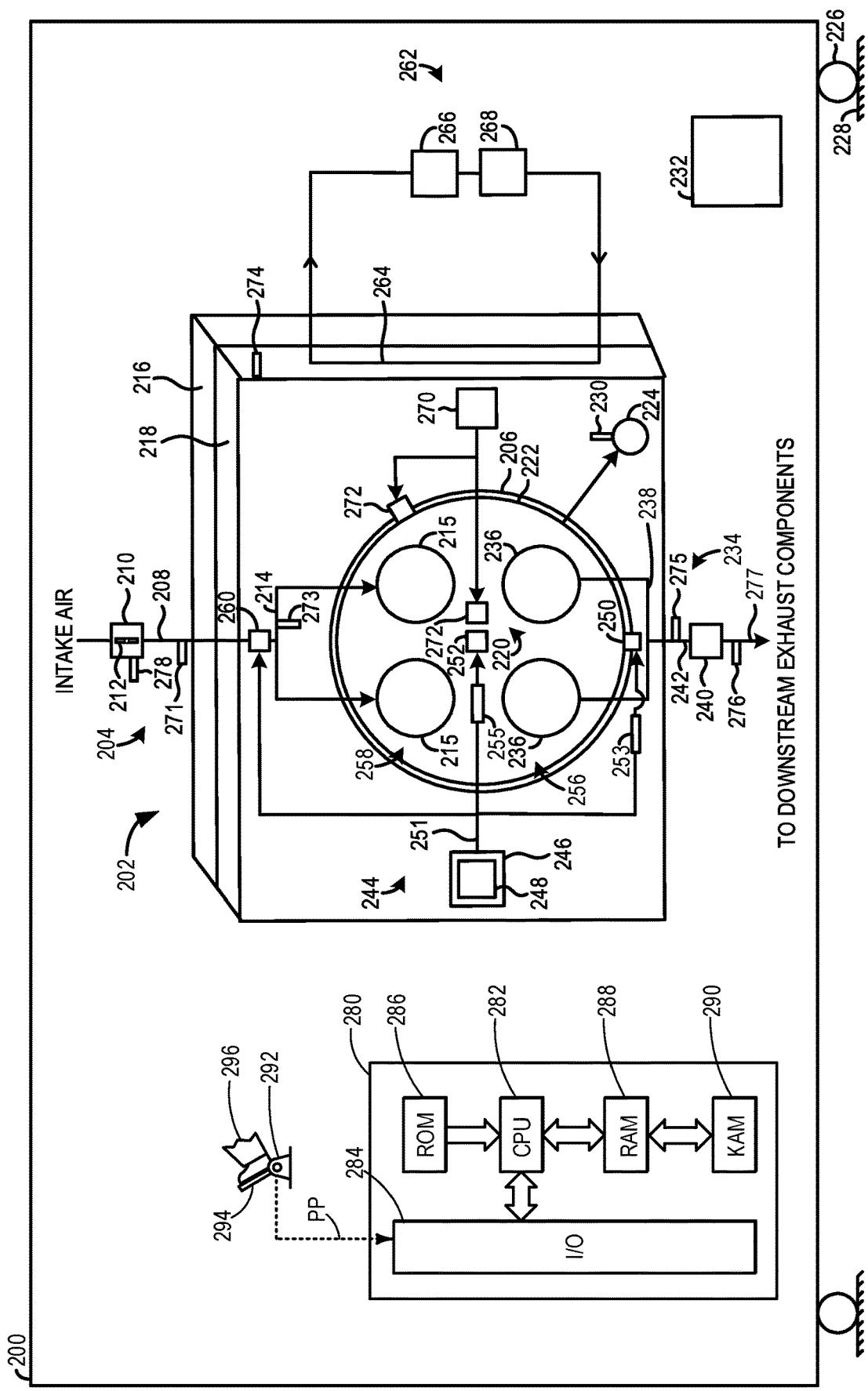
FIG. 2 shows a schematic depiction of a vehicle, internal combustion engine, and fuel delivery system.

FIG. 2 shows a schematic depiction of a vehicle 200 including an internal combustion engine 202. It will be appreciated that the internal combustion engine 202 is an example of internal combustion engine 10, shown in FIG. 1. Therefore, the engine 202 may include similar components and features to those described with regard to FIG. 1. Specifically, the relative arrangement of the injection devices described with regard to FIG. 1 may also apply to the injection devices described with regard to FIG. 2. Furthermore, a controller 280 shown in FIG. 2 may also be included in FIG. 1.

FIG. 2 shows an intake system 204 providing intake air to the cylinder 206. The intake system 204 includes an intake conduit 208 having an electronic throttle 210 positioned therein. A throttle plate 212 in the electronic throttle 210 may be adjusted to vary the amount of airflow traveling through the intake system 204 and entering the cylinder 206 via an intake manifold 214 and intake valves 215.

The cylinder 206 is formed via a cylinder block 216 and a cylinder head 218. Furthermore, the cylinder includes a combustion chamber 220 and a piston 222 disposed therein. Additionally, the piston 222 provides rotational energy to a crankshaft 224. In turn, the crankshaft 224 may be connected to the drive wheels 226 via a transmission (not shown). The drive wheels 226 are positioned on a road surface 228. An engine position sensor 230 is coupled to the crankshaft 224 and configured to generate an engine position signal that may be used to ascertain engine speed.

The vehicle 200 may also include an electric motor 232. Therefore, in such an example the vehicle 200 may be referred to as a hybrid vehicle. Different hybrid vehicle configurations have been contemplated such as parallel hybrid configurations, series hybrid configurations, mild hybrid configurations, etc. In such an example, both the electric motor 232 and/or the engine 202 may provide motive power to the drive wheels 226 on the road surface 228. However, in a non-hybrid configuration the engine 202 may only provide motive power to drive wheels 226.

An exhaust system 234 is also shown in the vehicle 200. The exhaust system 234 includes exhaust valves 236 coupled to cylinder 206. The exhaust valves 236 open and close to allow and inhibit exhaust gas flow from the cylinder into an exhaust manifold 238. An emission control device 240 is positioned in an exhaust conduit 242 downstream of the exhaust manifold 238. The emission control device 240 may include catalysts, filters, and/or other suitable components for reducing tailpipe emissions.

A fuel delivery system 244 is also provided in the engine 202. The fuel delivery system 244 includes a fuel tank 246 and fuel pump 248. A first direct fuel injection device 250 in the fuel delivery system 244 receives pressurized fuel from the fuel pump 248 via fuel line 251. It will be appreciated that fuel line 251 may include a fuel rail that provides a pressurized fuel reservoir to the fuel injection devices in the fuel delivery system. A second direct fuel injection device 252 in the fuel delivery system 244 also receives pressurized fuel from the fuel pump 248. As discussed above with regard to FIG. 1, the first direct fuel injection device 250 may be positioned on an exhaust side 256 of the combustion chamber 220 opposing an intake side 258 of the combustion chamber. As discussed above with regard to FIG. 1, the first direct fuel injection device 250 may extend through a cylinder liner and may be oriented such that fuel spray is direct at the intake valves 215.

The second direct fuel injection device 252 is shown positioned in the cylinder head 218 between the intake valves 215 and the exhaust valves 236. However, in other examples the second direct fuel injection device 252 may be positioned in the cylinder head 218 between the intake valves 215, between the exhaust valves 236, or in other suitable locations.

The fuel delivery system 244 may further include a fuel rail 253 connected to the first direct fuel injection device 250 and a fuel rail 255 connected to the second fuel injection device 252. The fuel rails may provide a pressurized fuel reservoir to each of the fuel injectors. Valves may be provide in and/or upstream of the fuel rails to enable fuel rail pressure regulation. Pressure in each of the fuel rails 253 and 255 may be independently regulated based on engine operating conditions, in one example. The regulation of the fuel rail pressure is described in greater detail herein.

A port fuel injection device 260 coupled to the intake conduit 208 may also be included in the fuel delivery system 244, in some examples. The port fuel injection device 260 is configured to deliver fuel into the intake system 204 upstream of the intake valves 215. However, in other examples the port fuel injection device 260 may be omitted from the fuel delivery system 244. The fuel injection devices deliver liquid fuel in proportion to a voltage pulse width or fuel injector pulse width of a signal from controller 280. Furthermore, the fuel delivery system 244 may include additional components that are not illustrated such as a second pump (e.g., high pressure pump), valves, a fuel rail, etc., for providing fuel within a desired pressure range to the fuel injectors.

A cooling system 262 is also provided in the engine 202. The cooling system 262 includes a cooling jacket 264 routing coolant through the cylinder head 218. Specifically in one example, the cooling jacket 264 may include passages that at least partially surround the exhaust manifold 238 and/or exhaust runners in the exhaust system 234. A heat exchanger 266 is also provided in the cooling system 262 to enable heat to be extracted from the coolant. Additionally, a coolant pump 268 is also included in the cooling system 262 to drive coolant circulation through the cooling jacket. Additionally, the cylinder block 216 may also include a coolant jacket, in some examples.

Distributorless ignition system 270 provides an ignition spark to the combustion chamber 220 via spark plugs 272 in response command signals from the controller 280. As shown, one of the spark plugs 272 is positioned between the intake valves 215 and the exhaust valves 236 and is adjacent to the second direct fuel injection device 252. Additionally, one of the spark plugs 272 is positioned on the intake side 258 of the combustion chamber 220. Furthermore, each of the spark plugs 272 may be positioned in the cylinder head 218. It will be appreciated that in other examples the ignition system 270 may include one of the spark plugs 272.

Additionally, a mass airflow sensor 271 is also coupled to the intake conduit 208 and configured to determine the airflow in the intake conduit and generate an airflow signal. A pressure sensor 273 is also coupled to the intake manifold 214 configured to determine a manifold air pressure and generate a MAP signal. The manifold air pressure may be used to determine engine load, in one example. Furthermore, a temperature sensor 274 may also be coupled to the engine 202. The temperature sensor is configured to determine engine temperature and generate an engine temperature signal.

An exhaust gas sensor 275 (Universal Exhaust Gas Oxygen (UEGO)) is shown coupled to exhaust manifold 238 upstream of the emission control device 240. Additionally or alternatively, a two-state exhaust gas oxygen sensor may be coupled to the exhaust manifold 238. A temperature sensor 276 may also be coupled to the exhaust conduit 277. The temperature sensor 276 may be configured to determine the temperature of the exhaust gas in the exhaust system 234.

Controller 280 is shown in FIG. 2 as a conventional microcomputer including: microprocessor unit 282, input/output ports 284, read-only memory 286 (e.g., non-transitory memory), random access memory 288, keep alive memory 290, and a conventional data bus. Controller 280 is shown receiving various signals from sensors coupled to engine 202 including: engine coolant temperature (ECT) from temperature sensor 274; a position sensor 292 coupled to an accelerator pedal 294 for sensing force applied by foot 296; a measurement of engine manifold pressure (MAP) from pressure sensor 273 coupled to intake manifold 214; an engine position from the engine position sensor 230 (e.g., Hall effect sensor) sensing crankshaft 224 position/speed; a measurement of air mass entering the engine from sensor 271; and a measurement of throttle position from sensor 278. In one example, the engine position sensor 230 may produce a predetermined number of equally spaced pulses every revolution of the crankshaft from which engine speed (RPM) can be determined. The controller 280 may also be configured to control adjustment of various engine components such as the electronic throttle 210, the first direct fuel injection device 250, the second direct fuel injection device 252, the port fuel injection device 260, and/or the coolant pump 268. For instance, the controller 280 may send a command signal to the first direct fuel injection device 250 to adjust the fuel pulse width of the device. Responsive to receiving the command signal an actuator (e.g., solenoid) in the first direct fuel injection device 250 may be operated according to the adjusted fuel pulse width. It will be appreciated that other engine components may also include actuators and may be controlled in this way.

During operation, each cylinder within engine 202 typically undergoes a four stroke cycle: the cycle includes the intake stroke, compression stroke, expansion stroke, and exhaust stroke. During the intake stroke, generally, the exhaust valves 236 close and intake valves 215 open. Air is introduced into combustion chamber 220 via intake manifold 214, and piston 222 moves to the bottom of the cylinder to increase the volume within combustion chamber 220. The position at which piston 222 is near the bottom of the cylinder and at the end of its stroke (e.g., when combustion chamber 220 is at its largest volume) is typically referred to by those of skill in the art as bottom dead center (BDC). During the compression stroke, intake valves 215 and exhaust valves 236 are closed. Piston 222 moves toward the cylinder head to compress the air within combustion chamber 220. The point at which piston 222 is at the end of its stroke and closest to the cylinder head (e.g., when combustion chamber 220 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plugs 272, resulting in combustion. During the expansion stroke, the expanding gases push piston 222 back to BDC. Crankshaft 224 converts piston movement into a rotational torque of the rotary shaft. Finally, during the exhaust stroke, the exhaust valves 236 open to release the combusted air-fuel mixture to exhaust manifold 238 and the piston returns to TDC. Note that the above is shown merely as an example, and that intake and exhaust valve opening and/or closing timings may vary, such as to provide positive or negative valve overlap, late intake valve closing, or various other examples.

Figure 3:
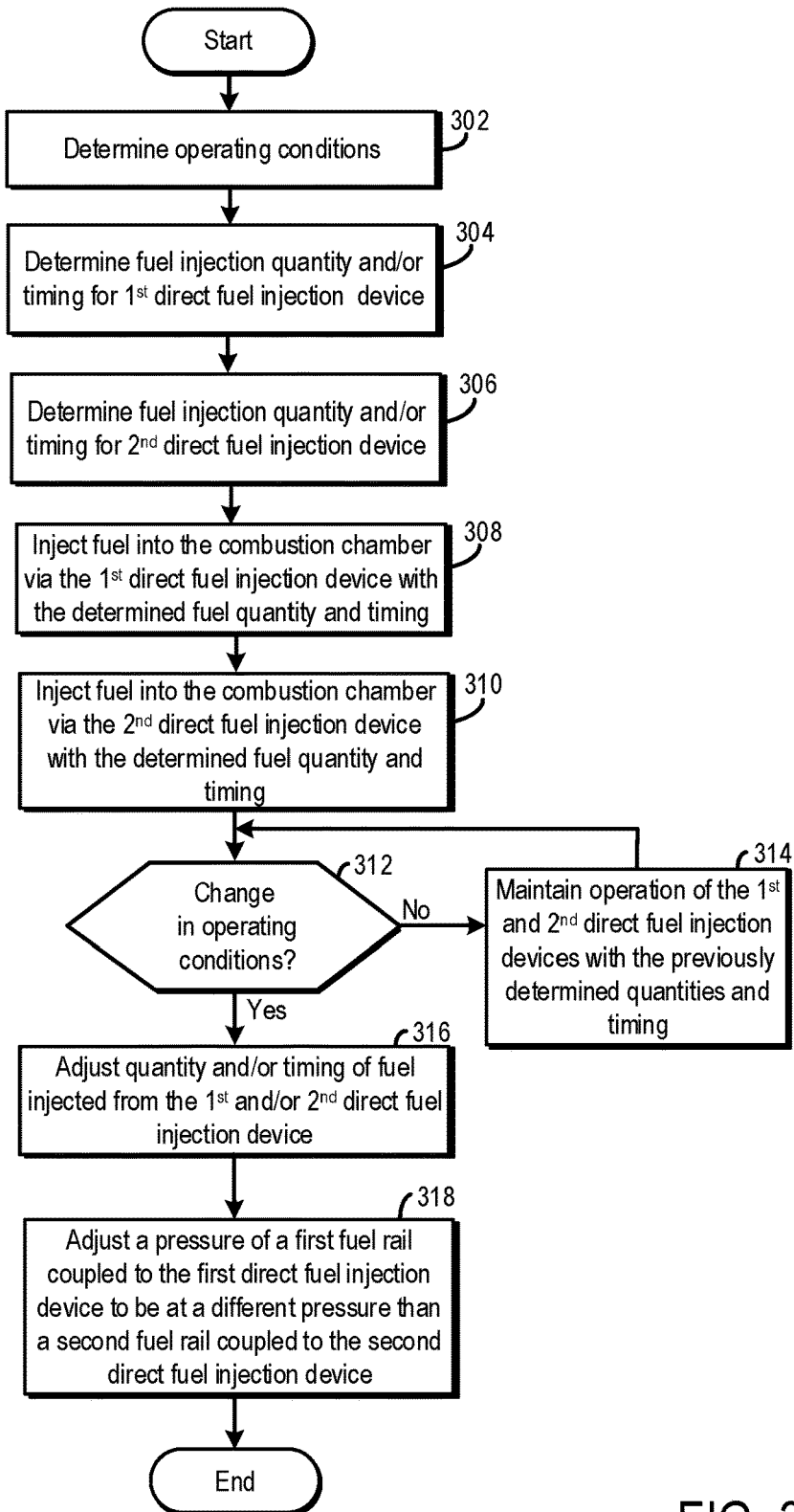
FIG. 3 shows a method for controlling a fuel delivery system.

FIG. 3 shows method 300 for operating a fuel delivery system. Specifically, the method 300 depicts a technique for injecting fuel into a combustion chamber. The method 300 may be implemented by the internal combustion engine, fuel delivery system, components, etc., described above with regard to FIGS. 1 and 2. Furthermore, the method may be stored as instructions in non-transitory memory executable by a processor, in one example. Moreover, it will be appreciated that the instructions described in the method 300 may trigger actuators in the engine, fuel delivery system, injection components, etc., to provide the desired function.

At 302, the method includes determining engine operating conditions. The engine operating conditions may include engine speed $n_{mot}$ of the internal combustion engine, load of the internal combustion engine, pressure of the combustion air in the intake system upstream of the cylinder, speed of the combustion air in the intake system upstream of the cylinder, engine temperature, exhaust gas pressure, exhaust gas flowrate, etc.

Next at 304, the method includes determining fuel injection quantity and/or timing for a first direct fuel injection device. In one example, the first direct fuel injection device may extend through a cylinder liner on an exhaust side of the cylinder such that fuel spray from the first direct fuel injection device is directed towards an intake valve. However, other positions of the first direct fuel injection device have been contemplated.

At 306, the method includes determining a fuel injection quantity and/or timing for a second direct fuel injection device. In one example, the second direct fuel injection device may extend through the cylinder head at a location between an intake valve and an exhaust valve. However, other locations of the second direct fuel injection device may be used, in other examples. Furthermore, the central axes of the first and second direct fuel injection devices may be arranged at an obtuse angle to enable the sprays from the devices to interact with one another to promote mixing of the combustion charge. A determined fuel quantity $m_{1,fuel}$ corresponding to the first direct fuel injection device and a determined fuel quantity $m_{2,fuel}$ corresponding to the second direct fuel injection device may form a ratio $m_{1,fuel}/m_{2,fuel}$ that may be defined as a function of at least one of engine speed $n_{mot}$ of the internal combustion engine, load of the internal combustion engine, pressure of the combustion air in the intake system upstream of the at least one cylinder, and speed of the combustion air in the intake system upstream of the at least one cylinder. Furthermore, it will be appreciated that the quantities and timing of fuel injection from the first and second direct fuel injection device determined at steps 304 and 306 may apply to a single combustion cycle.

At 308, the method includes injecting fuel into the combustion chamber via the first direct fuel injection device with the determined fuel quantity and timing. At 310, the method includes injecting fuel into the combustion chamber via the second direct fuel injection device with the determined fuel quantity and timing. It will be appreciated that steps 308 and 310 may take place during a single combustion cycle (e.g., during an intake stroke). For instance, initially fuel from the second direct fuel injection device, positioned in the cylinder head, may be sprayed into the combustion chamber while the piston is moving downward away from top dead center. When the piston travels below the first direct fuel injection device, positioned in the cylinder liner, fuel spray from the device may be initiated. Continuing with such an example, after initiating of fuel injection from the first direct fuel injection device fuel injection from the second direct fuel injection device may be sustained such that the injections occur at overlapping time intervals. In one instance, the amount of fuel injected from the second direct fuel injection device may be decreased when fuel injection in the first direct fuel injection device is initiated. However, in other instances, the amount of fuel injected from the second direct fuel injection device may be decreased or stopped when fuel injection from the first direct fuel injection device is initiated. Further in one example, fuel injected from the first and second direct fuel injection devices may be coordinated such that fuel is simultaneously sprayed from each device at substantially equivalent time intervals during an intake stroke. However, other injection control schemes have been contemplated, such as control techniques where fuel from the second direct fuel injection device is increased when fuel injection from the first direct fuel injection device is initiated.

At 312, the method includes determining if there is a change in engine operating conditions. For instance, an increase or decrease in engine speed and/or load may be identified. In another example, an increase or decrease in engine and/or exhaust gas temperature may be identified.

If it is determined that there is not a change in engine operating conditions (NO at 312) the method proceeds to 314. At 314, the method includes maintaining operation of the first and second direct fuel injection devices with the previously determined quantities and timing. After 314, the method returns to 312. Maintaining operation of the first and second direct fuel injection devices may include maintaining operation of the first and second fuel injection devices within a previously determined quantity and timing range, in one example. In other examples, the first and second fuel injection devices may be operated with previously ascertained quantity and/or timing set points (e.g., pulse width), ratios, etc.

However, if it is determined that there is a change in engine operating conditions (YES at 312) the method advances to 316. At 316, the method includes adjusting the quantity and/or timing of fuel injected from the first and/or second direct fuel injection device. In one example, such as when engine load is increased, the pulse width of the first direct fuel injection device may be increased while the pulse width of the second direct fuel injection device remains substantially unchanged. In another example, the pulse width of the first direct fuel injection device may be increased while the pulse width of the second direct fuel injection device is decreased or vice versa. Additionally in one example, when the intake valve timing is retarded the timing of the first direct fuel injection device and/or the second direct fuel injection device may be delayed or vice versa. Further, in one example, the timing of the fuel injected from the first direct fuel injection device may be delayed when spark is retarded in the engine.

In one example, the method may include, at 318, adjusting a pressure of a first fuel rail coupled to the first direct fuel injection device to be at a different pressure than a second fuel rail coupled to the second direct fuel injection device, the rail pressures adjusted responsive to engine speed and load. In this way, rail pressure may be independently regulated for each of the direct fuel injectors. Further, it will be appreciated that in one example step 318 may occur prior to or during step 316. In one example, the pressure in the fuel rail connected to the second direct fuel injection device may be set higher than the pressure in the fuel rail connected to the first direct fuel injection device. It will be appreciated that the pressure of the fuel provided to the second direct fuel injector may be higher due to the fact that the injector is exposed to a higher pressure when positioned in the cylinder head when compared to the first direct fuel injector positioned in the cylinder block. Further, in one example, pressure in the fuel rail coupled to the first direct fuel injection device may be increased responsive to an increase in engine load and/or speed. Continuing with such an example, pressure in the fuel rail coupled to the second direct fuel injection device may be decreased responsive to an increase in engine load and/or speed. Therefore, in some instance the pressure in the fuel rail connected to the first direct fuel injection device may be higher than the pressure in the fuel rail connected to the second direct fuel injection device when the engine speed and/or load increases past a threshold value. Conversely, in another example, pressure in the fuel rail coupled to the first direct fuel injection device may be decreased responsive to a decrease in engine load and/or speed and pressure in the fuel rail coupled to the second direct fuel injector may be increased. In another example, pressure in both of the fuel rails may be correspondingly increased or decreased responsive to an increase or decrease in engine speed and/or load.

Further in one example, when the engine load is below a threshold value fuel may be injected from only the second direct fuel injection device into the combustion chamber. Conversely, when the engine load is above the threshold value fuel may be injected from both the first and second fuel injection devices into the combustion chamber at overlapping time intervals during one combustion cycle. Injecting fuel in this way enables an increase in mixing of the air-fuel mixture and a decrease in wall wetting in the cylinder during high load conditions.

In yet another example, when the engine load is above a threshold value and both the fuel injectors are slated to inject fuel during a single combustion cycle, fuel rail pressure may be increased via an increase in the output of a fuel pump (e.g., high pressure fuel pump). In this way, a desired amount of fuel pressure can be provided to both of the direct fuel injectors. Conversely, when the engine load is below the threshold value, fuel rail pressure may be decreased.

In another example, fuel injection timing of the second direct fuel injection device may be delayed or advanced when injection from the first fuel injection device is resumed in response to an increase or decrease in engine load, engine speed, etc.

The invention will further be described in the following paragraphs. In one aspect, a direct-injection, applied-ignition internal combustion engine is provided. The direct-injection, applied-ignition internal combustion engine comprises: at least one cylinder head including at least one cylinder; where each cylinder has at least one inlet opening for the supply of combustion air via an intake system and at least one outlet opening for the discharge of exhaust gases via an exhaust-gas discharge system; where each cylinder comprises a combustion chamber which is jointly formed by a piston crown of a cylinder-specific piston, by a cylinder liner which laterally delimits the combustion chamber, and by the at least one cylinder head, the cylinder-specific piston being movable along a piston longitudinal axis between a bottom dead center and a top dead center; where each cylinder is equipped, in a region of the cylinder liner, with an injection device for the direct injection of fuel into the combustion chamber, which injection device has at least one opening which, during the course of an injection process, can be activated for the purposes of introducing fuel into the combustion chamber; and where each cylinder is equipped with an additional injection device which is arranged in the at least one cylinder head, the injection device being oriented toward the additional injection device such that a virtual elongation of a longitudinal axis of the injection device forms an obtuse angle $\alpha$ with a virtual elongation of a longitudinal axis of the additional injection device in a projection perpendicular to the piston longitudinal axis.

In another aspect, a method for operating a direct-injection, applied-ignition internal combustion engine is provided. The method comprises: injecting a fuel quantity $m_{1,fuel}$ into the combustion chamber using an injection device during the course of one working cycle; injecting a fuel quantity $m_{2,fuel}$ into the combustion chamber using an additional injection device during the course of the one working cycle; wherein a ratio $m_{1,fuel}/m_{2,fuel}$ is defined as a function of at least one of engine speed $n_{mot}$ of the internal combustion engine, load of the internal combustion engine, pressure of the combustion air in the intake system upstream of the at least one cylinder, and speed of the combustion air in the intake system upstream of the at least one cylinder.

In another aspect, a method for operating a fuel injection system is provided. The method comprises: injecting fuel from a first direct fuel injection device into a combustion chamber; and injecting fuel from a second direct fuel injection device into the combustion chamber, the second direct fuel injection device and the first direct fuel injection device arranged at an obtuse angle with regard to an intersection of central axes of the first and second direct fuel injection devices.

In any of the aspects or combinations of the aspects, the injection device may be inclined relative to the piston longitudinal axis in the direction of the at least one cylinder head.

In any of the aspects or combinations of the aspects, the additional injection device may be arranged between the at least one inlet opening and the at least one outlet opening.

In any of the aspects or combinations of the aspects, the angle $\alpha$ is between 120 and 180 degrees.

In any of the aspects or combinations of the aspects, the at least one cylinder may have at least two inlet openings for the supply of combustion air to the combustion chamber.

In any of the aspects or combinations of the aspects, the at least one cylinder may have at least two outlet openings for the discharge of the exhaust gases from the combustion chamber.

In any of the aspects or combinations of the aspects, each cylinder may be equipped with a port injection device that is arranged in an intake system.

In any of the aspects or combinations of the aspects, the at least one cylinder may be equipped with an ignition device initiating the applied ignition.

In any of the aspects or combinations of the aspects, each cylinder may be equipped with an additional ignition device initiating the applied ignition.

In any of the aspects or combinations of the aspects, the cylinder-specific piston may be equipped with at least one piston ring that is arranged in a piston skirt region that laterally delimits the cylinder-specific piston and seals off the combustion chamber.

In any of the aspects or combinations of the aspects, when the cylinder-specific piston is situated at top dead center, the at least one piston ring may be positioned between the injection device and top dead center.

In any of the aspects or combinations of the aspects, the injection device may be oriented toward the at least one cylinder-specific inlet opening in such a way that the fuel emerging from the injection device is directed counter to the combustion air entering the combustion chamber via the inlet opening.

In any of the aspects or combinations of the aspects, fuel may be injected simultaneously from the injection device and the additional injection device into the combustion chamber.

In any of the aspects or combinations of the aspects, the method may further comprise adjusting at least one of a timing and quantity of fuel injected from each of the first direct fuel injection device and the second direct fuel injection device based on a change in engine operating conditions.

In any of the aspects or combinations of the aspects, adjusting at least one of the timing and quantity of fuel injected from each of the first direct fuel injection device and the second direct fuel injection device based on a change in engine operating conditions may include increasing an amount of fuel injected from the first direct fuel injection device while decreasing an amount of fuel injected from the second direct fuel injection device.

In any of the aspects or combinations of the aspects, the first fuel injection device may be positioned vertically above the second direct fuel injection device with regard to a central axis of the combustion chamber.

In any of the aspects or combinations of the aspects, the first direct fuel injection device may be positioned on an exhaust side of the combustion chamber and the second direct fuel injection device may be positioned between an intake valve and an exhaust valve.

In any of the aspects or combinations of the aspects, fuel may be injected from each of the first direct fuel injection device and the second direct fuel director at overlapping time intervals and the method may further comprise adjusting a pressure of a first fuel rail coupled to the first direct fuel injection device to be at a different pressure than a second fuel rail coupled to the second direct fuel injection device, the rail pressures adjusted responsive to engine speed and load.

In any of the aspects or combinations of the aspects, the additional injection device may be arranged in the middle between the at least one inlet opening and the at least one outlet opening.

In any of the aspects or combinations of the aspects, the obtuse angle α formed between the injection devices in the applied-ignition internal combustion engine may be >120°.

In any of the aspects or combinations of the aspects, the obtuse angle α formed between the injection devices in the applied-ignition internal combustion engine may be >130°.

In any of the aspects or combinations of the aspects, the obtuse angle α formed between the injection devices in the applied-ignition internal combustion engine may be >140°.

In any of the aspects or combinations of the aspects, the obtuse angle α formed between the injection devices in the applied-ignition internal combustion engine may be >150°.

In any of the aspects or combinations of the aspects, the obtuse angle α formed between the injection devices in the applied-ignition internal combustion engine may be >160°.

In any of the aspects or combinations of the aspects, the obtuse angle α formed between the injection devices in the applied-ignition internal combustion engine may be >170°.

In any of the aspects or combinations of the aspects, the angle α formed between the injection devices in the applied-ignition internal combustion engine may be ≈180°.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A direct-injection, applied-ignition internal combustion engine comprising:
    a cylinder head, and a cylinder;
    wherein the cylinder has at least one inlet opening for the supply of combustion air via an intake system and at least one outlet opening for the discharge of exhaust gases via an exhaust-gas discharge system;
        wherein the cylinder comprises a combustion chamber which is jointly formed by a piston crown of a piston, by a cylinder liner which laterally delimits the combustion chamber, and by the cylinder head, the piston being movable along a piston longitudinal axis between a bottom dead center and a top dead center;
        wherein the cylinder is equipped, in a region of the cylinder liner, with an injection device for the direct injection of fuel into the combustion chamber, which injection device has at least one opening which, during the course of an injection process, can be activated for the purposes of introducing fuel into the combustion chamber;

wherein the cylinder is equipped with an additional injection device which is arranged in the cylinder head, the injection device being oriented toward the additional injection device such that a virtual elongation of a longitudinal axis of the injection device forms an obtuse angle α with a virtual elongation of a longitudinal axis of the additional injection device in a projection perpendicular to the piston longitudinal axis; and wherein, during a same combustion cycle, the injection device is configured to introduce the fuel into the combustion chamber by injecting the fuel in a direction away from the cylinder head, and the additional injection device is configured to introduce further fuel into the combustion chamber by injecting the further fuel in a different direction towards the cylinder head and towards the fuel introduced by the injection device, wherein both the fuel and the further fuel are liquid fuels, and wherein the cylinder is equipped with an ignition device and an additional ignition device initiating the applied ignition.

2. The direct-injection, applied-ignition internal combustion engine of claim 1, wherein the injection device is inclined relative to the piston longitudinal axis in the direction of the cylinder head.

3. The direct-injection, applied-ignition internal combustion engine of claim 1, wherein the additional injection device is arranged between the at least one inlet opening and the at least one outlet opening.

4. The direct-injection, applied-ignition internal combustion engine of claim 1, wherein the angle α is between 120 and 180 degrees.

5. The direct-injection, applied-ignition internal combustion engine of claim 1, wherein the cylinder has at least two inlet openings for the supply of combustion air to the combustion chamber.

6. The direct-injection, applied-ignition internal combustion engine of claim 1, wherein the cylinder has at least two outlet openings for the discharge of the exhaust gases from the combustion chamber.

7. The direct-injection, applied-ignition internal combustion engine of claim 1, wherein the cylinder is equipped with a port injection device that is arranged in the intake system.

8. The direct-injection, applied-ignition internal combustion engine of claim 1, wherein the cylinder-specific piston is equipped with at least one piston ring which is arranged in a piston skirt region which laterally delimits the cylinder-specific piston and seals off the combustion chamber.

9. The direct-injection, applied-ignition internal combustion engine of claim 8, wherein, when the cylinder-specific piston is situated at top dead center, the at least one piston ring is positioned between the injection device and top dead center.

10. The direct-injection, applied-ignition internal combustion engine of claim 1, wherein the injection device is oriented toward the at least one cylinder-specific inlet opening in such a way that the fuel emerging from the injection device is directed counter to the combustion air entering the combustion chamber via the inlet opening.

11. The direct-injection, applied-ignition internal combustion engine of claim 1, further comprising a controller and executable instructions stored in non-transitory memory of the controller that cause the controller to inject fuel to the cylinder from the additional injection device arranged in the cylinder head into the cylinder while the piston crown is moving away from top dead center, and then while the piston crown is still moving away from top dead center beginning to inject fuel into the cylinder via the injection device when the piston crown travels below the injection device.

12. The direct-injection, applied-ignition internal combustion engine of claim 11, wherein the piston is equipped with at least one piston ring which is arranged in a piston skirt region which laterally delimits the piston and seals off the combustion chamber.

13. The direct-injection, applied-ignition internal combustion engine of claim 12, wherein, when the piston is situated at top dead center, the at least one piston ring is positioned between the injection device and top dead center.

14. The direct-injection, applied-ignition internal combustion engine of claim 11, further comprising additional instructions to define a ratio of injected fuel from the injection device and the additional injection device as a function of at least one of engine speed and engine load.

* * * * *